US009440240B2

(12) United States Patent
Mills et al.

(10) Patent No.: US 9,440,240 B2
(45) Date of Patent: Sep. 13, 2016

(54) COMBINED IONIC AIR FILTER AND HUMIDIFIER APPARATUS

(71) Applicant: Brookstone Purchasing, Inc., Merrimack, NH (US)

(72) Inventors: Stephen B. Mills, Atkinson, NH (US); Christopher M. Petersen, Milford, NH (US)

(73) Assignee: Brookstone Purchasing, Inc., Merrimack, NH (US)

(*) Notice: Subject to any disclaimer, the term of this patent is extended or adjusted under 35 U.S.C. 154(b) by 117 days.

(21) Appl. No.: 14/221,639

(22) Filed: Mar. 21, 2014

(65) Prior Publication Data

US 2015/0266031 A1    Sep. 24, 2015

(51) Int. Cl.
| B03C 3/017 | (2006.01) |
| F24F 3/16 | (2006.01) |
| F24F 6/00 | (2006.01) |
| F24F 11/00 | (2006.01) |
| B01D 53/32 | (2006.01) |
| B03C 3/019 | (2006.01) |

(Continued)

(52) U.S. Cl.
CPC .............. *B03C 3/017* (2013.01); *B01D 53/32* (2013.01); *B03C 3/019* (2013.01); *B03C 3/08* (2013.01); *B03C 3/155* (2013.01); *B03C 3/32* (2013.01); *B03C 3/368* (2013.01); *B03C 3/41* (2013.01); *B03C 3/47* (2013.01); *F24F 3/166* (2013.01); *F24F 6/00* (2013.01); *F24F 11/0008* (2013.01); *F24F 11/0079* (2013.01); *B01D 2259/4508* (2013.01); *B01D 2259/818* (2013.01); *B03C 2201/04* (2013.01); *B03C 2201/28* (2013.01); *F24F 2003/008* (2013.01); *F24F 2003/1682* (2013.01); *Y02B 30/746* (2013.01)

(58) Field of Classification Search
CPC combination set(s) only.
See application file for complete search history.

(56) References Cited

U.S. PATENT DOCUMENTS

| 3,474,598 A * | 10/1969 | Keuls .................. F24F 3/12 220/8 |
| 4,496,375 A | 1/1985 | Le Vantine |

(Continued)

FOREIGN PATENT DOCUMENTS

| DE | 4338713 A1 * | 10/1994 | ............... F24F 3/16 |
| JP | WO 2013047135 A2 * | 4/2013 | ............. F24F 3/166 |
| WO | 2013095176 A1 | 6/2013 | |

OTHER PUBLICATIONS

PCT International Search Report and Written Opinion mailed Jul. 6, 2015, received in corresponding PCT Application No. PCT/US15/21426, 8 pgs.

*Primary Examiner* — Duane Smith
*Assistant Examiner* — Sonji Turner
(74) *Attorney, Agent, or Firm* — Grossman Tucker Perreault & Pfleger, PLLC

(57) ABSTRACT

A combined ionic air filter and humidifier apparatus filters air using ionic air filtering, humidifies at least a portion of the filtered ionized air, and directs the humidified filtered ionized air back into the environment. The apparatus generally includes an ionic air filter for ionizing and filtering air to produce filtered ionized air and a humidifier for humidifying the filtered ionized air to produce humidified filtered ionized air. A humidifier manifold fluidly couples the humidifier with the ionic air filter in a manner that does not allow the humidifier to interfere with operation of the ionic air filter. One or more fans draw the air into the ionic air filter and direct at least a portion of the filtered ionized air into the humidifier manifold such that the humidified filtered ionized air is discharged from the humidifier manifold.

15 Claims, 9 Drawing Sheets

(51) Int. Cl.
  *B03C 3/08*     (2006.01)
  *B03C 3/155*    (2006.01)
  *B03C 3/32*     (2006.01)
  *B03C 3/36*     (2006.01)
  *B03C 3/41*     (2006.01)
  *B03C 3/47*     (2006.01)
  *F24F 3/00*     (2006.01)

(56)　　　　　　References Cited

U.S. PATENT DOCUMENTS

| | | | |
|---|---|---|---|
| 4,686,069 A * | 8/1987 | Hahne | F24F 3/166 |
| | | | 261/92 |
| 5,354,515 A | 10/1994 | Ushimaru | |
| 5,428,964 A * | 7/1995 | Lobdell | F24F 11/0009 |
| | | | 236/44 C |
| 5,464,572 A * | 11/1995 | Bonzi | B05B 17/0615 |
| | | | 250/324 |
| 5,480,588 A | 1/1996 | Tomasiak et al. | |
| 5,524,848 A | 6/1996 | Ellsworth | |
| 5,529,726 A | 6/1996 | Glenn | |
| D372,078 S | 7/1996 | Cunning | |
| 5,890,367 A * | 4/1999 | You | F24F 3/161 |
| | | | 454/187 |
| 6,152,383 A | 11/2000 | Chen | |
| 6,248,155 B1 | 6/2001 | Seaman | |
| 6,390,378 B1 * | 5/2002 | Briscoe, Jr. | A23L 3/3418 |
| | | | 236/44 C |
| 6,427,984 B1 | 8/2002 | Mulvaney et al. | |
| 6,604,733 B2 | 8/2003 | Mulvaney et al. | |
| 6,715,739 B2 | 4/2004 | Mulvaney et al. | |
| 6,810,732 B2 | 11/2004 | Shon | |
| 7,350,773 B2 | 4/2008 | French et al. | |
| 7,362,037 B2 | 4/2008 | Kang | |
| 7,362,964 B2 | 4/2008 | Wang | |
| 7,461,835 B2 | 12/2008 | Petz et al. | |
| 7,467,786 B2 | 12/2008 | Jae-Bong et al. | |
| 7,494,532 B2 * | 2/2009 | Azukizawa | B05B 5/0255 |
| | | | 239/690 |
| 7,621,984 B2 * | 11/2009 | Cowie | B03C 3/08 |
| | | | 95/75 |
| 7,654,508 B2 | 2/2010 | Wegner et al. | |
| 7,751,167 B2 | 7/2010 | Chuang-Pan et al. | |
| D621,019 S | 8/2010 | Kim et al. | |
| 7,875,104 B2 * | 1/2011 | Cowie | B03C 3/08 |
| | | | 96/39 |
| 7,971,857 B1 | 7/2011 | Mazza | |
| 8,167,963 B2 * | 5/2012 | Kang | F24F 3/1603 |
| | | | 261/118 |
| 8,282,696 B2 * | 10/2012 | Kang | F24F 3/1603 |
| | | | 261/118 |
| 8,366,817 B2 | 2/2013 | Ulunov | |
| D682,406 S | 5/2013 | Yeom | |
| 8,434,743 B2 | 5/2013 | Ahn et al. | |
| 8,544,825 B2 * | 10/2013 | Lee | A61L 9/22 |
| | | | 261/30 |
| 8,696,800 B2 * | 4/2014 | Storm | F24F 3/166 |
| | | | 700/276 |
| 2003/0072675 A1 * | 4/2003 | Takeda | A61L 9/22 |
| | | | 422/22 |
| 2005/0005510 A1 | 1/2005 | Brault et al. | |
| 2006/0131449 A1 * | 6/2006 | Azukizawa | B05B 5/0255 |
| | | | 239/690.1 |
| 2008/0030919 A1 | 2/2008 | Botvinnik | |
| 2008/0314250 A1 * | 12/2008 | Cowie | B03C 3/08 |
| | | | 96/86 |
| 2009/0139408 A1 * | 6/2009 | Kang | F24F 3/1603 |
| | | | 96/366 |
| 2010/0031823 A1 * | 2/2010 | Cowie | B03C 3/08 |
| | | | 96/44 |
| 2010/0200398 A1 * | 8/2010 | Thiruppathi | C02F 1/4618 |
| | | | 204/274 |
| 2010/0258644 A1 * | 10/2010 | Kagawa | C02F 1/281 |
| | | | 236/44 A |
| 2011/0005261 A1 * | 1/2011 | Lee | A61L 9/22 |
| | | | 62/331 |
| 2011/0011268 A1 | 1/2011 | Lee et al. | |
| 2011/0031636 A1 | 2/2011 | Ediger et al. | |
| 2011/0232497 A1 * | 9/2011 | Kang | F24F 3/1603 |
| | | | 96/371 |
| 2012/0234166 A1 | 9/2012 | Markham et al. | |
| 2012/0247326 A1 * | 10/2012 | Storm | F24F 11/0079 |
| | | | 95/25 |
| 2014/0090562 A1 * | 4/2014 | Choi | F24F 3/166 |
| | | | 96/53 |
| 2014/0216259 A1 * | 8/2014 | Iwaki | F24F 3/166 |
| | | | 96/19 |

* cited by examiner

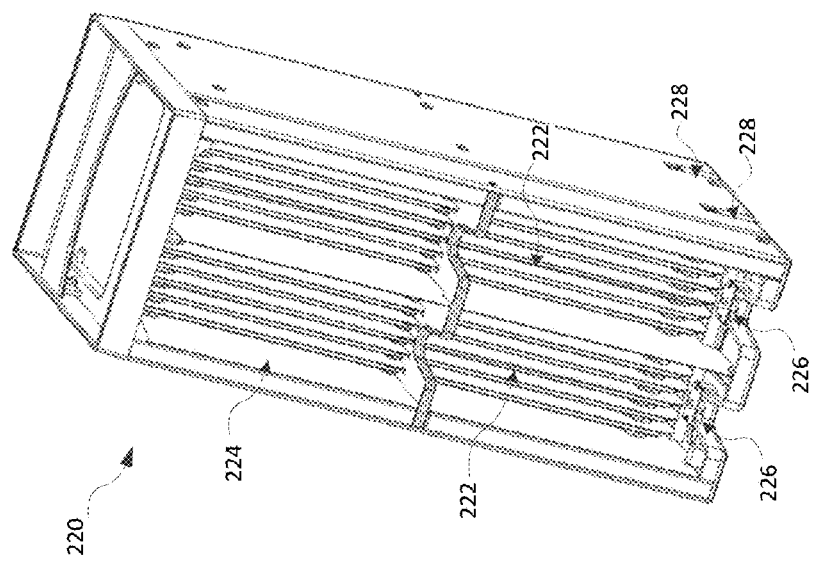
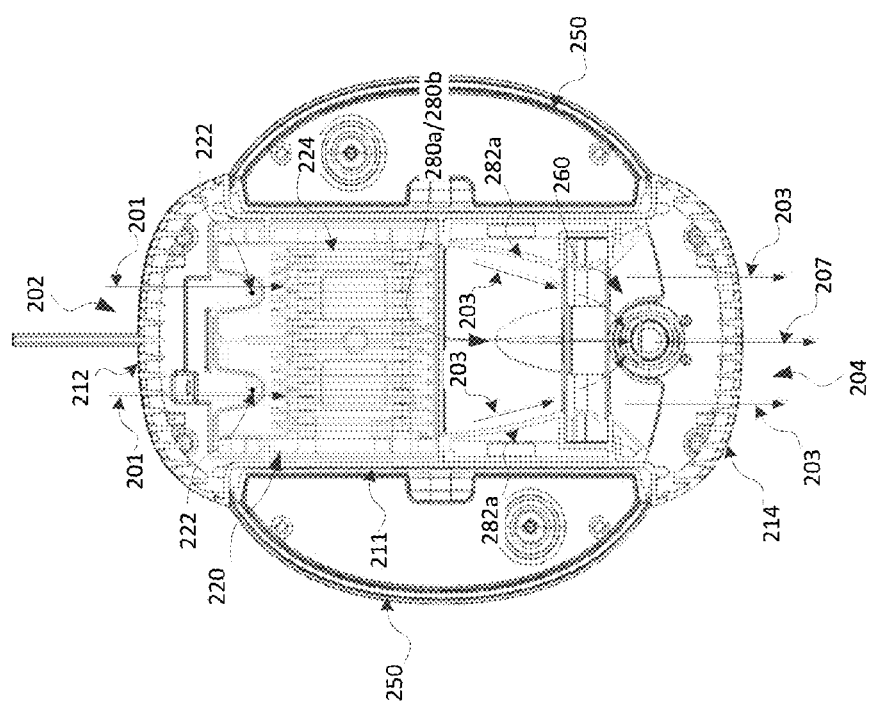
FIG. 5
FIG. 4

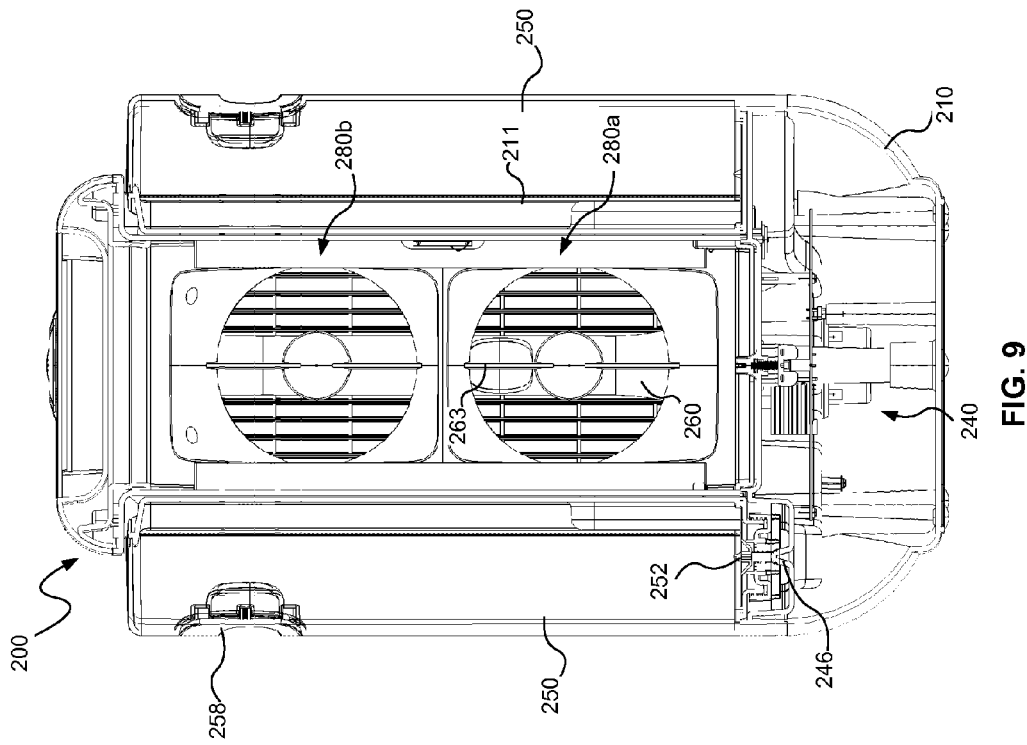
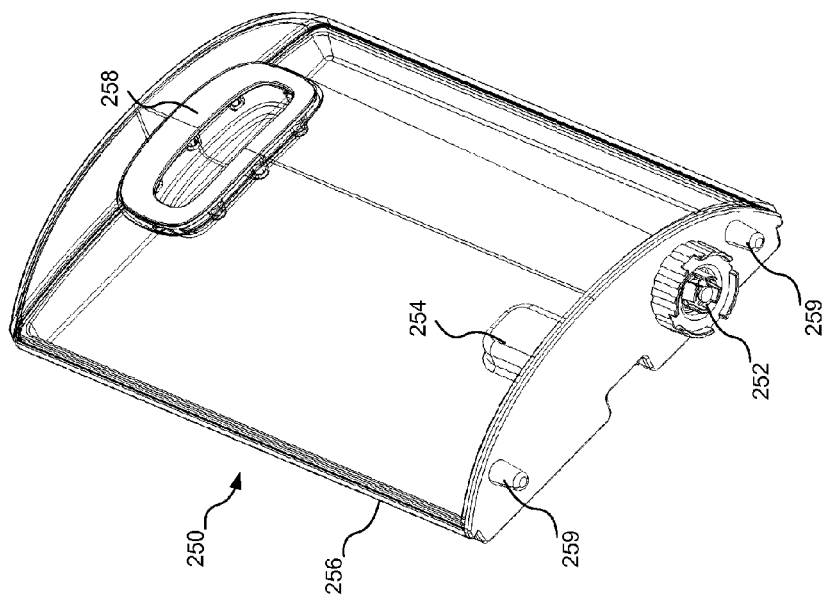

COMBINED IONIC AIR FILTER AND HUMIDIFIER APPARATUS

TECHNICAL FIELD

The present disclosure relates to air filters and humidifiers and more particularly, to a combined ionic air filter and humidifier apparatus.

BACKGROUND INFORMATION

Air quality within an enclosed environment, such as a home or office, can present a significant health concern, particularly for individuals having respiratory illnesses and diseases. Adverse health effects may be caused by different air quality issues including both airborne contaminants (e.g., smoke, pollen, and dust) and low humidity. Various types of devices have been developed in an effort to improve the quality of air within such environments by treating these air quality issues. In particular, ionic air purifiers, such as the Pure-Ion® ionic air purifier available from Brookstone®, may be used to improve air quality by ionic filtering to remove airborne particles. Humidifiers may be used to improve air quality by increasing the moisture in the air to raise the humidity. Thus, separate devices are often needed to improve the overall air quality.

Although air purifiers and humidifiers can be used separately to address the separate issues of airborne contaminants and low humidity, a single integrated device that effectively performs both airborne contaminant removal and humidification would be advantageous. Combining ionic air filtering and humidification into one integrated device, however, presents unique challenges because they operate in significantly different ways. In particular, ionic air filters use charged electrical surfaces to generate electrically charged air and humidifiers use water to add moisture to the air. The incompatibility of these two significantly different principles of operation may have prevented these devices from being combined effectively.

BRIEF DESCRIPTION OF THE DRAWINGS

These and other features and advantages will be better understood by reading the following detailed description, taken together with the drawings wherein:

FIG. 4 is a cross-sectional top view of the combined ionic air filter and humidifier apparatus shown in FIG. 2.

FIG. 5 is a perspective view of a removable ionic air filter for use in the combined ionic air filter and humidifier apparatus shown in FIG. 2.

FIG. 8 is a bottom perspective view of a removable water tank for use in the combined ionic air filter and humidifier apparatus shown in FIG. 2.

FIG. 9 is a cross-sectional front view of the combined ionic air filter and humidifier apparatus shown in FIG. 2.

DETAILED DESCRIPTION

A combined ionic air filter and humidifier apparatus, consistent with embodiments of the present disclosure, filters air using ionic air filtering, humidifies at least a portion of the filtered ionized air, and directs the humidified filtered ionized air back into the environment. The combined ionic air filter and humidifier apparatus is designed to provide ionic air filtering and humidification simultaneously but may also be operated separately as an ionic air filter or a humidifier. As used herein, the term "filtered air" refers to air with at least some contaminants removed from the air but does not require removal of all contaminants from the air. Similarly, the terms "purify" and "purified" do not require the air to be completely free of all contaminants. The term "ionized" refers to negatively charging air and the term "humidified" refers to adding moisture to air.

Figure 1:
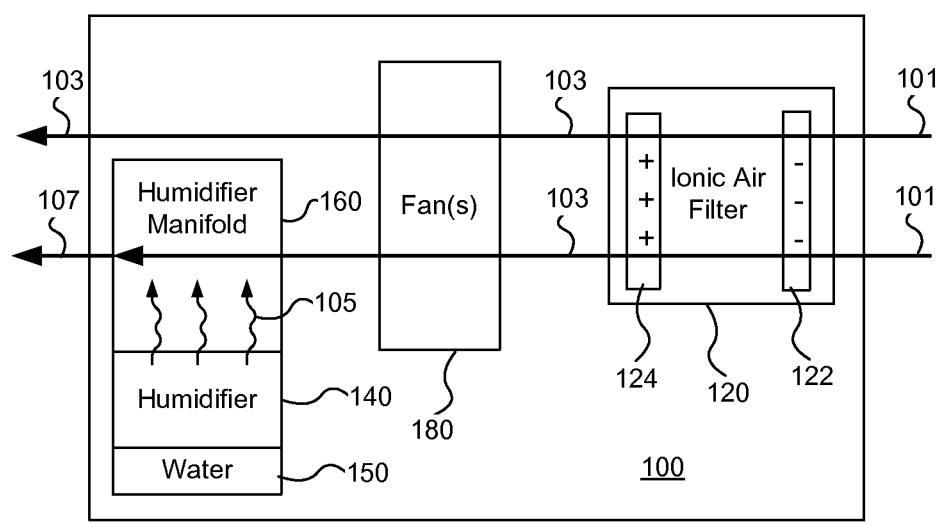
FIG. 1 is a schematic diagram of a combined ionic air filter and humidifier apparatus consistent with the present disclosure.

Referring to FIG. 1, a combined ionic air filter and humidifier apparatus 100 generally includes an ionic air filter 120 for ionizing and filtering air 101 to produce filtered ionized air 103 and a humidifier 140 for humidifying the filtered ionized air 103 to produce humidified filtered ionized air 107. The humidifier 140 and the ionic air filter 120 may be separated within the apparatus 100 such that both operate independently without interfering with the operation of the other. The combined ionic air filter and humidifier apparatus 100 also includes a humidifier manifold 160 for fluidly coupling the humidifier 140 with the ionic air filter 120 in a manner that does not allow the humidifier 140 to interfere with operation of the ionic air filter 120. One or more fans 180 draw the air 101 into the ionic air filter 120 and direct at least a portion of the filtered ionized air 103 into the humidifier manifold 140 such that the humidified filtered ionized air 107 is discharged from the humidifier manifold 140. The fan(s) 180 may also direct at least a portion of the filtered ionized air 103 to the environment without passing through the humidifier manifold 160.

The ionic air filter 120 includes an ionizer 122 for negatively charging the air passing through to ionize the air and a collector 124 for collecting negatively charged particles from the ionized air to filter the air. The ionic air filter 120 may be provided as a removable ionizer cartridge, which may be removed, cleaned and reused, as will be described in greater detail below. Additional filters using other filtration techniques may also be used, for example, before and/or after the ionic air filter 120.

The humidifier 140 adds moisture 105 to the filtered ionized air 103 from a source of water 150 to generate the humidified filtered ionized air 107. The humidifier 140 may include an ultrasonic humidifier that causes droplets of the water 150 to enter the air by vibrating at an ultrasonic frequency. Other types of humidifiers may also be used, such as an evaporative humidifier, a vaporizer, or an impeller humidifier. The source of water 150 may include one or more water tanks, channels, and/or chambers that deliver water to the humidifier 140 in a manner that prevents the water from interfering with the operation of the ionic air filter 120.

The humidifier manifold 160 includes at least a filter intake fluidly coupled to the ionic air filter 120 and a humidifier intake fluidly coupled to the humidifier 140. The humidifier manifold 160 thus separately receives the filtered ionized air 103 from the ionic air filter 120 and the moisture 105 from the humidifier 140. The humidifier manifold 160 mixes the filtered ionized air 103 and the moisture 105 as the air 103 flows through and then discharges the humidified filtered ionized air 107.

At least one of the fan(s) 180 is aligned with the filter intake of the humidifier manifold 160 and configured to direct the filtered ionized air 103 into the humidifier manifold 160. The fan(s) 180 cause sufficient flow of the filtered ionized air 103 in the humidifier manifold 160 to mix the filtered ionized air 103 with the moisture 105 and to discharge the humidified filtered ionized air 107 from the apparatus 100. The level of ionic air filtering and/or humidification may be controlled by controlling the speed of the fan(s) 180.

Referring to FIGS. 2-15, one embodiment of a combined ionic air filter and humidifier apparatus 200 is shown and described in greater detail. Although a specific embodiment is shown and described, other embodiments of the combined ionic air filter and humidifier apparatus, as described generally above, are within the scope of the present disclosure and claims. Each of the components of the combined ionic air filter and humidifier apparatus 200 described below may be varied within the scope of the present disclosure and claims.

Figure 2:
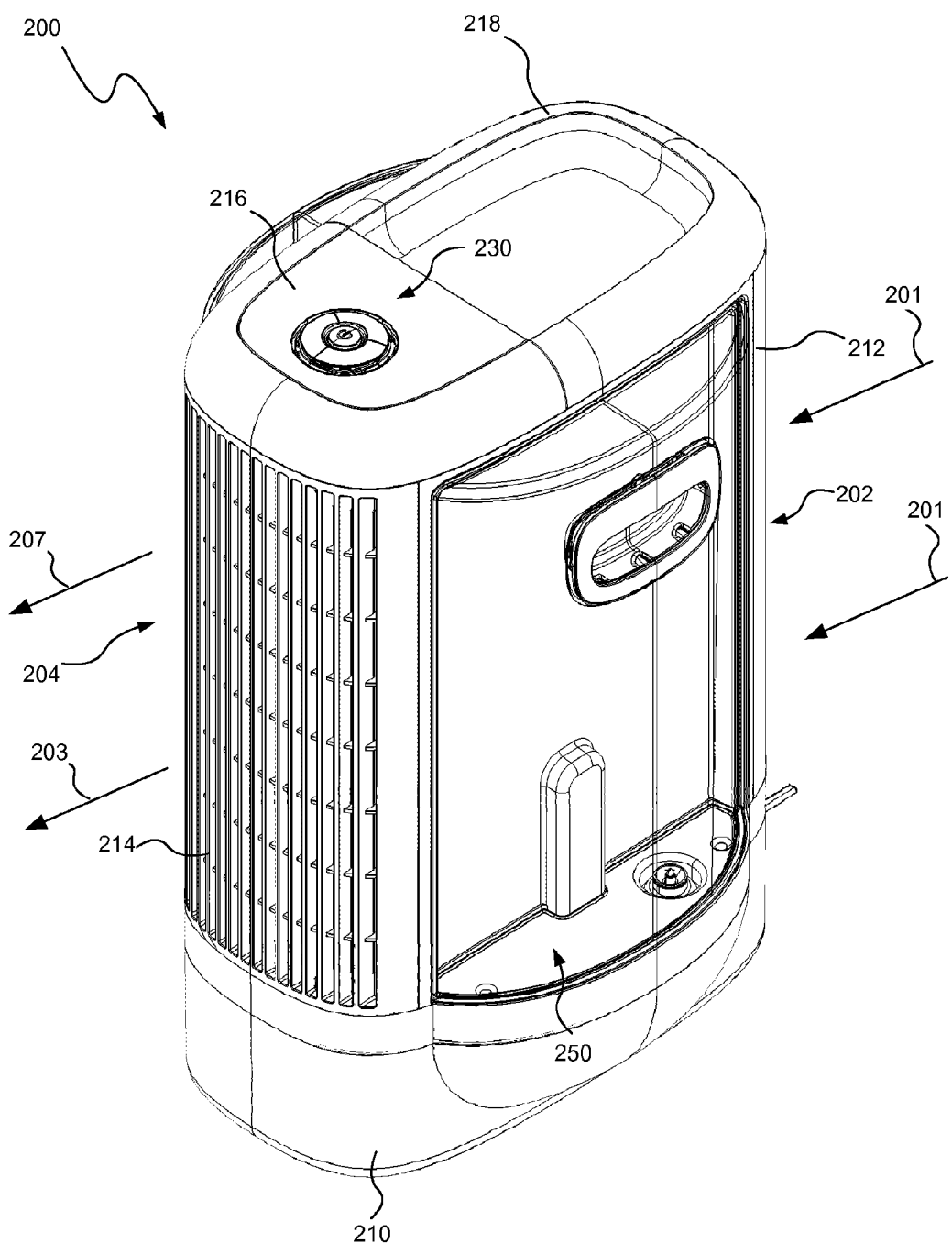
FIG. 2 is a perspective view of one embodiment of a combined ionic air filter and humidifier apparatus consistent with the present disclosure.
Figure 3:
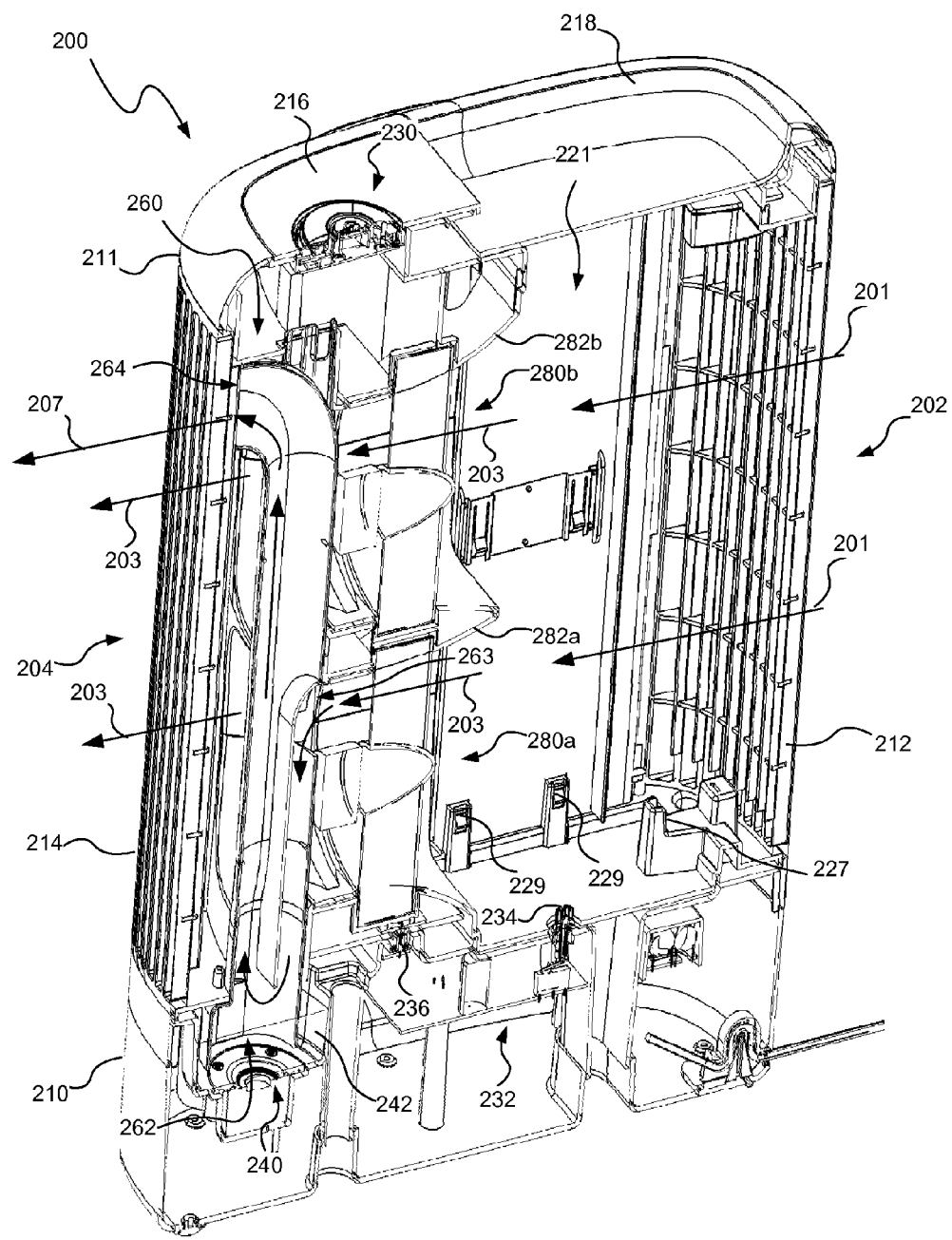
FIG. 3 is a cross-sectional side perspective view of the combined ionic air filter and humidifier apparatus shown in FIG. 2.

As shown in FIGS. 2-4, the combined ionic air filter and humidifier apparatus 200 draws air 201 through an intake side 202, ionizes and filters the air, humidifies the air, and discharges filtered ionized air 203 and humidified filtered ionized air 207 from a discharge side 204. The combined ionic air filter and humidifier apparatus 200 includes a base 210 and a housing 211 extending upright from the base 210. The housing 211 includes an intake grill 212 on the intake side 202 and a discharge grill 214 on the discharge side 214. Air 201 passes into the intake side 202 through the intake grill 212 and the filtered ionized air 203 and the humidified filtered ionized air 207 pass out of the discharge side 204 through the discharge grill 214. In this embodiment, the base 210 contains a humidifier 240 and the housing 211 contains an ionic air filter 220, a humidifier manifold 260, and fans 280. Water tanks 250 are removably mounted to the base 210 on each side of the housing 211.

The housing 211 also includes a top panel 216 with a user interface 230 for controlling operation of the humidifier and air filter. The user interface 230 may include, for example, a power on/off button, a humidity button for controlling humidity levels (e.g., low, medium, high), an air purification button for controlling air purification (e.g., low, medium, high), and a timer button for setting an operation time (e.g., number of hours). The user interface 230 is electrically connected to control circuitry 232 (e.g., circuit boards) enclosed within the base 210 (see FIG. 3). The control circuitry 232 is electrically connected to the ionic air filter 220, to the humidifier 240, and to the fans 280 to provide power and control, for example, in response to user input at the user interface 230.

Figure 7:
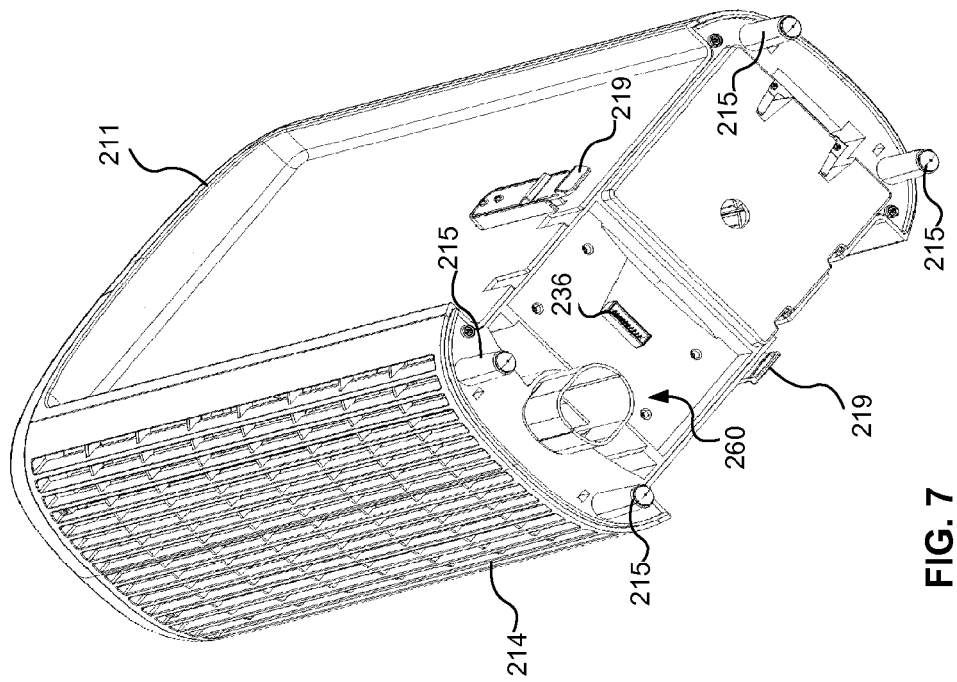
FIG. 7 is a bottom perspective view of a housing of the combined ionic air filter and humidifier apparatus shown in FIG. 2.
Figure 6:
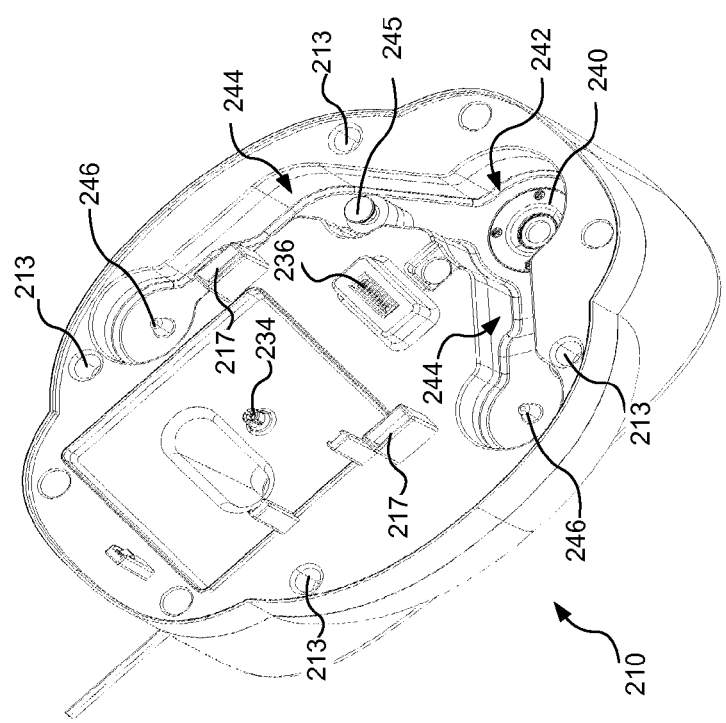
FIG. 6 is a top perspective view of a base of the combined ionic air filter and humidifier apparatus shown in FIG. 2.
Figure 10:
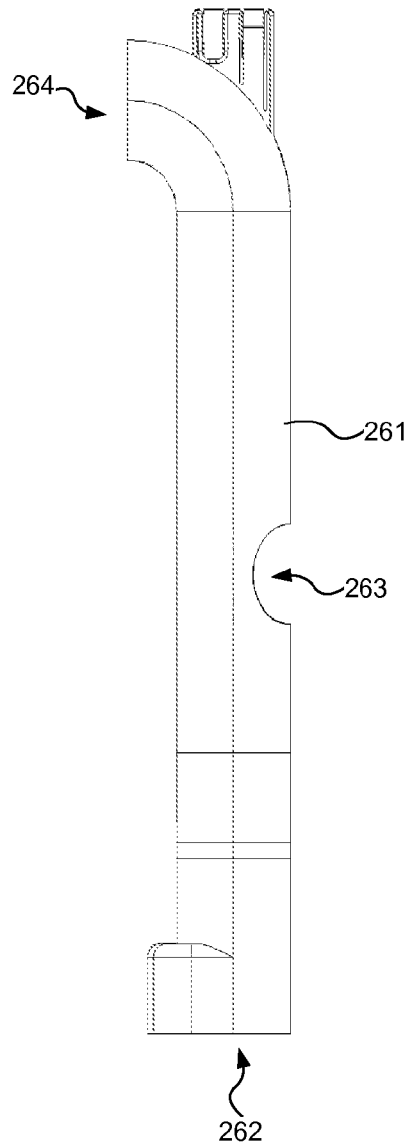
FIG. 10 is a side view of the humidifier manifold used in the combined ionic air filter and humidifier apparatus shown in FIG. 2.
Figure 11:
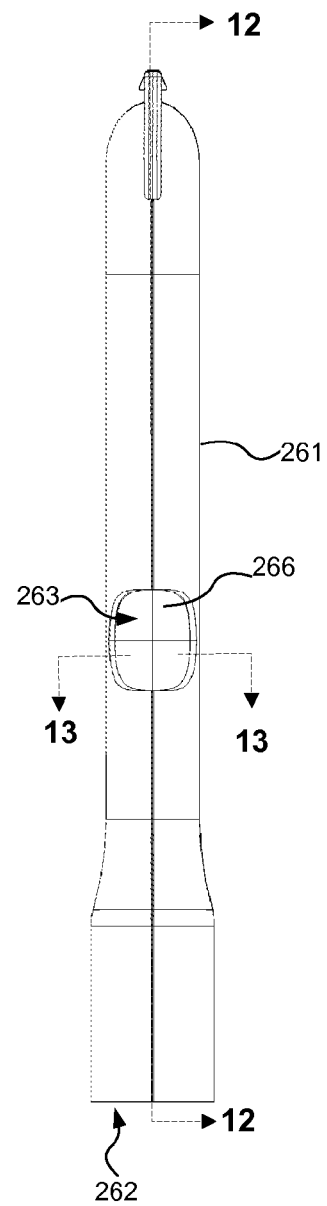
FIG. 11 is a back view of the humidifier manifold shown in FIG. 10.
Figure 12:
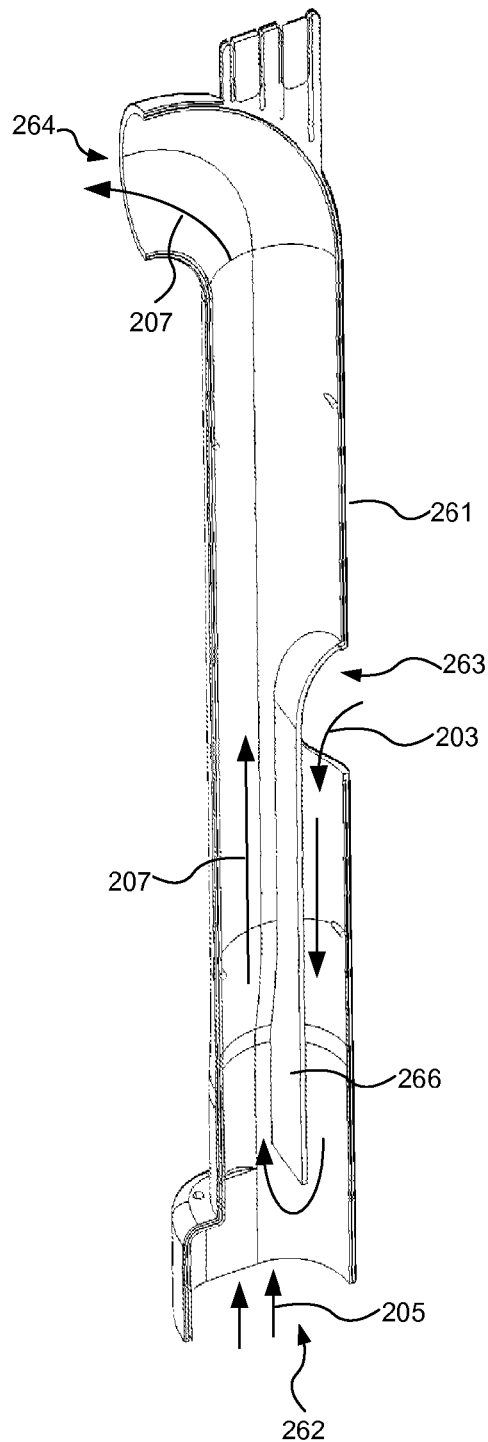
FIG. 12 is a cross-sectional perspective view of the humidifier manifold taken along line 12-12 in FIG. 11.
Figure 13:
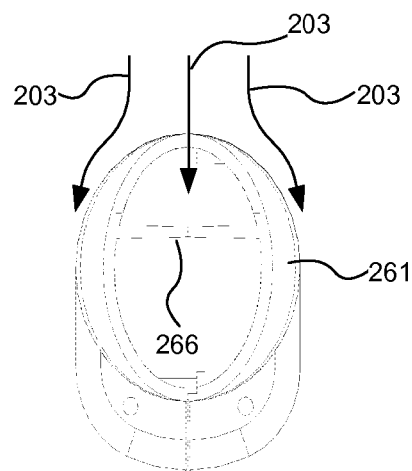
FIG. 13 is a cross-sectional top view of the humidifier manifold taken along line 13-13 in FIG. 11.
Figure 15:
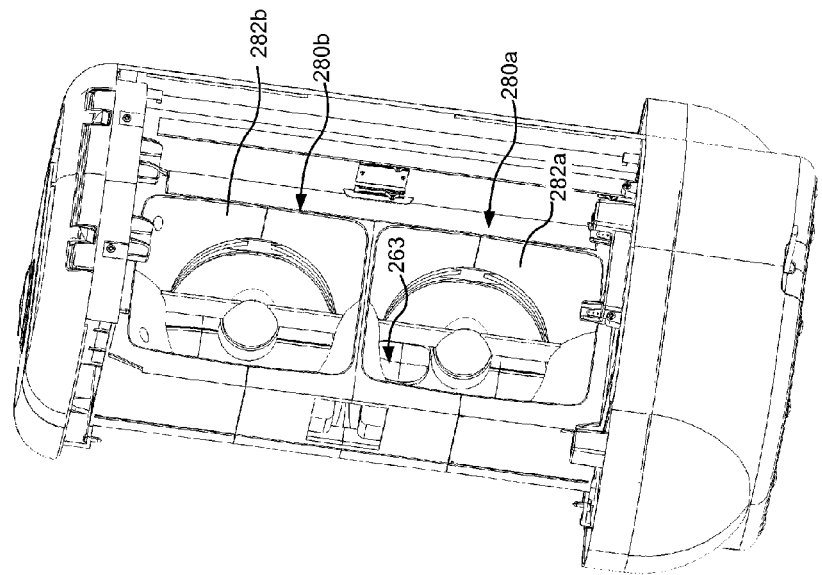
FIG. 15 is a rear perspective view of the humidifier manifold and fans inside of the combined ionic air filter and humidifier apparatus shown in FIG. 2.
Figure 14:
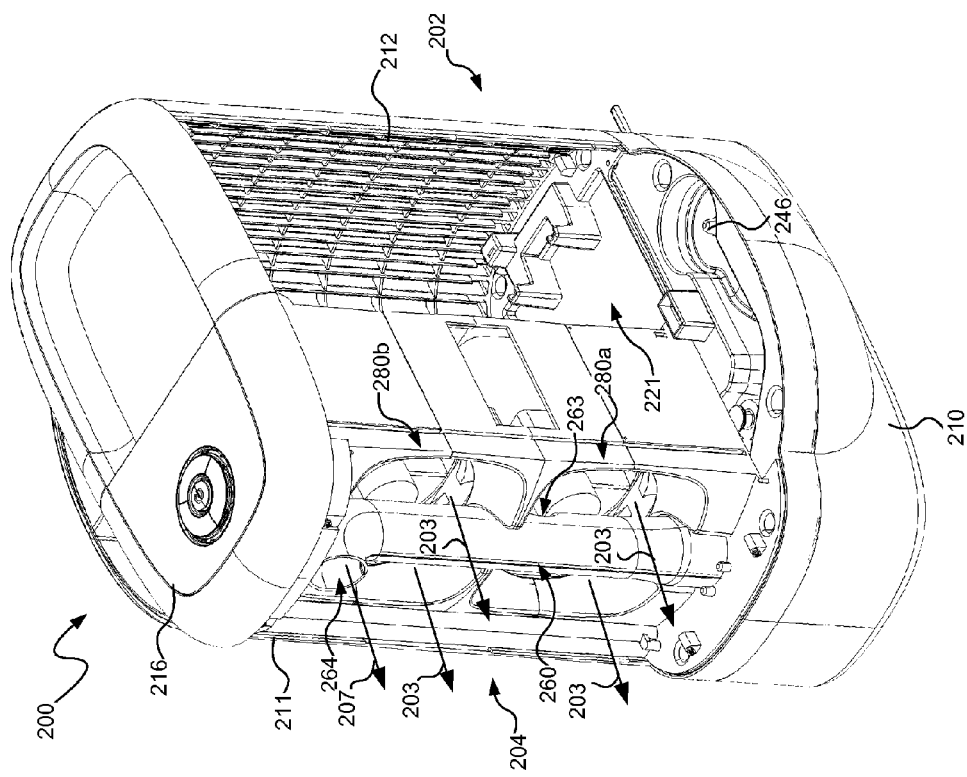
FIG. 14 is a front perspective view of the humidifier manifold and fans inside of the combined ionic air filter and humidifier apparatus shown in FIG. 2.

In the example embodiment, the housing 211 is removably mounted on the base 210. As shown in FIGS. 6 and 7, the base 210 and the housing 211 include mating alignment structures 213, 215 for aligning the housing 211 relative to the base 210. The base 210 and the housing 211 also include mating latching members 217, 219 for releasably securing the housing 211 to the base 210. In other embodiments, other types of alignment structures and coupling mechanisms may be used or the base and the housing may be integrally attached without be separable.

As shown in FIG. 4, the ionic air filter 220 (not shown in FIG. 3) is located in an ionic air filter chamber 221 in the housing 211 proximate the intake side 202. The housing 211 includes a hinged filter door 218 that opens to allow the ionic air filter 220 to be removed and inserted into the air filter chamber 221. As shown in greater detail in FIG. 5, the ionic air filter 220 includes a removable and reusable filter cartridge similar to the type used in the Pure-Ion® ionic air purifier available from Brookstone®. The ionic air filter 220 may be capable of providing a CADR rating (clean air delivery rate) of over 100.

The ionic air filter 220 includes one or more ionization wires 222 for negatively charging air as it passes through and an array of collector plates 224 for collecting negatively charged particles as the air passes through. Negatively charging the air with the ionization wires 222 generates electrically charged ions that attach to airborne particles, which are then electrostatically attracted to the positively charged collector plates 224. The ionization wires 222 may be made of tungsten and the collector plates 224 may be made of 303 stainless steel. The voltage potential across the ionization wires 222 may be +7500 V. The collector plates 224 may be charged with different voltage potentials, such as a driver plate voltage of +3800 V and a collector plate voltage of 0 or ground. Although one type of an ionic air filter is shown, other types of ionic air filters with different configurations may also be used.

The ionic air filter 220 includes contacts 226 for electrically connecting a voltage source to the ionization wires 222 and contacts 228 for electrically connecting a voltage source to the collector plates 224. The contacts 226, 228 conductively engage corresponding contacts 227, 229 within the ionic air filter chamber 221 in the housing 211 (see FIG. 3). An air filter safety switch 234 is coupled to the control circuitry 232 and extends into the air filter chamber 221 for disabling the voltage to the ionic air filter 220 when the air filter 220 is removed from the air filter chamber 221. When the ionic air filter 220 is properly located in the air filter chamber 221, a portion (e.g., a projection) on the bottom of the ionic air filter 220 engages the safety switch 234, which enables the voltage potential to be applied to the ionization wires 222 and the collector plates 224 via the contacts 226-229, respectively.

As shown in FIG. 3, the humidifier 240 is located in a water chamber 242 in the base 210. The humidifier 240 may be an ultrasonic humidifier including a metal diaphragm that vibrates at an ultrasonic frequency to create atomized water droplets from the water in the water chamber 242. Other types of humidifiers may also be used.

As shown in greater detail in FIG. 6, the base 210 also defines water channels 244 that direct water to the water chamber 242. The channels 244 are sloped toward the water chamber to allow the water to flow into the chamber 242. A water sensor 245 is located in at least one of the water channels 244 for sensing a water level and stopping humidification if the water level is too low. The base 210 may also include notches (not shown) to allow water to flow outside of the base 210 to provide a visual indication of leakage during overflow, which may avoid interference with the operation of the ionic air filter.

When mounted to the base 210, as shown in FIG. 2, the water tanks 250 are fluidly coupled with the respective water channels 244 in the base 210 to deliver water from the tanks 250 to the water chamber 242 and the humidifier 240. As shown in greater detail in FIGS. 8 and 9, each of the water tanks 250 includes a release valve 252 that holds water in the tank 250 when the tank 250 is removed from the base 210 and allows water to pass through when the tank 250 is engaged with the base 210. The release valve 252 may be a spring loaded valve that is biased toward a closed position when the tank 250 is removed from the base 210. When the tank 250 is engaged with the base 210, a water release protrusion 246 in the respective water delivery channel 244 in the base 210 causes the valve 252 to open to release the water from the tank 250 into the water delivery channel 244.

The water tanks 250 have a semi-circular profile and include one or more reinforcing structures 254 on the walls 256 to prevent flexing. At least a portion of the water tanks 250 may be made of a translucent material, such as molded translucent plastic, with sufficient rigidity to hold water with minimal or no flexing. In one embodiment, the tanks 250 may have a capacity (e.g., 5 liters each) to hold enough water to last for 24 hours when the humidifier is on the highest setting. The tanks 250 also include handles 258 and alignment structures 259 to facilitate mounting and removing the tanks 250 on the base 210. The water tanks may also have other shapes and configurations.

As shown in FIGS. 3 and 4, the humidifier manifold 260 is located in the housing 211 proximate the discharge side 204 and extends through a bottom of the housing 211 into the water chamber 242 when the housing 211 is mounted on the base 210. The humidifier manifold 260 extends from the humidifier 240 in the water chamber 242 to an upper region of the discharge side 204. The humidifier manifold 260 receives moisture from the humidifier 240 and receives filtered ionized air 203 from the ionic air filter 220 and directs the humidified filtered ionized air 207 through the discharge grill 214.

As shown in greater detail in FIGS. 10 to 13, the humidifier manifold 260 includes a generally tubular body portion 261 with a humidifier intake port 262 at one end of the body portion 261, a discharge port 264 at another end of the body portion 261 and a filter intake port 263 at a mid section of the body portion 261. A manifold wall 266 extends from the filter intake port 263 toward the humidifier intake port 262 to direct the filtered ionized air 203 toward the humidifier 240. The filtered ionized air 203 mixes with moisture 205 from the humidifier 240 as the air flows around the manifold wall 266.

The humidified filtered ionized air 207 then flows upward through the manifold 260 to the discharge port 264. The tubular body portion 261 of the manifold 260 is bent proximate the discharge end such that the humidified filtered ionized air 207 is directed substantially horizontally out the discharge side 204 of the apparatus 200. The bend includes rounded sections without right angles to facilitate smooth flow of the humidified filtered ionized air 207 out of the discharge port 264 without significant water accumulation in the manifold 260. The discharge end of the humidifier manifold 260 may also include slots (not shown) that mate with the discharge grill 214 such that the discharge end passes at least partially through the discharge grill 214, which may prevent water accumulation on the grill. The humidifier manifold may also have other shapes and configurations.

As shown in FIG. 4, the fans 280a, 280b are located in the housing 211 between the ionic air filter 220 and the humidifier manifold 260. As shown in greater detail in FIGS. 14 and 15, a first fan 280a is positioned to direct at least a portion of the filtered ionized air 203 into the filter intake port 263 of the humidifier manifold 260. Both fans 280a, 280b also direct filtered ionized air 203 around the manifold 260 without entering the filter intake port 263. Aligning the first fan 280a with the filter intake port 263 eliminates the need for a separate fan for the humidifier, which reduces the cost and noise. The generally tubular body portion 261 has an elliptical cross-sectional shape (see FIG. 13) to facilitate air flow around the manifold 260 with reduced back pressure to the fans 280a, 280b. Ducted cowlings 282a, 282b are provided between the ionic air filter 220 and the fans 280a, 280b to direct and orient the filtered ionized air 203. The ducted cowlings 282a, 282b provide a smooth transition in the air passage through the fans 280a, 280b to facilitate air flow with less power and less noise.

The fans 280a, 280b may be muffin fans capable of providing air flow at a rate of about 98 cubic feet per minute (CFM). A fan system connector 236 (see FIGS. 3, 6 and 7) provides an electrical connection between the fans 280a, 280b and the control circuitry 232. The speed of the fans 280a, 280b may be controlled through the user interface 230, which also controls the level of air purification and/or humidification. The fans 280a, 280b may also be operated in a drying mode without operating the ionic air filter 220 and/or the humidifier 240. Although two fans are shown in the illustrated embodiment, other numbers of fans may be used in other configurations.

Accordingly, the combined ionic air filter and humidifier apparatus, consistent with the present disclosure, provides both ionic air filtering and humidification integrated in one device. The combined ionic air filter and humidifier apparatus allows an ionic air filter and a humidifier to operate simultaneously and combines the humidification and ionic air filtering in a way that prevents the humidification from interfering with ionic air filtering.

Consistent with one embodiment, a combined ionic air filter and humidifier apparatus includes an ionic air filter for ionizing air and for removing charged particles from the ionized air to produce filtered ionized air and a humidifier for generating moisture. The combined ionic air filter and humidifier apparatus further includes a humidifier manifold configured to mix the filtered ionized air produced by the ionic air filter with the moisture generated by the humidifier to produce humidified filtered ionized air. The humidifier manifold includes a humidifier intake port fluidly coupled to the humidifier, a filter intake port fluidly coupled to the ionic air filter, and a discharge port for discharging the humidified filtered ionized air. The combined ionic air filter and humidifier apparatus further includes at least one fan for drawing air through the ionic air filter and directing at least a portion of the filtered ionized air into the filter intake port of the humidifier manifold such that the filtered ionized air mixes with the moisture generated by the humidifier as the air passes through the humidifier manifold.

Consistent with another embodiment, a method of filtering and humidifying air, the method includes: filtering air by ionizing the air and collecting negatively charged particles in the ionized air to produce filtered ionized air; directing at least a portion of the filtered ionized air into a humidifier manifold; adding moisture to the filtered ionized air inside the humidifier manifold to produce humidified filtered ionized air; and discharging the humidified filtered ionized air.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A combined ionic air filter and humidifier apparatus comprising:
   an electrical ionic air filter for ionizing air with electrically charged ions that attach to airborne particles and for removing charged particles from the ionized air to produce filtered ionized air;
   a humidifier for generating moisture;
   a humidifier manifold configured to mix the filtered ionized air produced by the ionic air filter with the moisture generated by the humidifier to produce humidified filtered ionized air, the humidifier manifold including a humidifier intake port fluidly coupled to the humidifier for receiving humidified air from the humidifier, a filter intake port fluidly coupled to the ionic air filter for separately receiving filtered ionized air from the ionic air filter, and a discharge port for discharging the humidified filtered ionized air; and
   at least one fan for drawing air through the ionic air filter and directing at least a portion of the filtered ionized air into the filter intake port of the humidifier manifold such that the filtered ionized air mixes with moisture generated by the humidifier as air passes through the humidifier manifold.

2. The combined ionic air filter and humidifier apparatus of claim 1 wherein the ionic air filter includes an ionizer for ionizing air and a collector for collecting negatively charged particles in the ionized air.

3. The combined ionic air filter and humidifier apparatus of claim 2 wherein ionic air filter is a removable filter cartridge.

4. The combined ionic air filter and humidifier apparatus of claim 1 wherein the ionic air filter provides a Clean Air Delivery Rate (CADR) rating of at least 100.

5. The combined ionic air filter and humidifier apparatus of claim 1 wherein the at least one fan includes a plurality of fans and at least one of the fans is positioned to direct at least a portion of the filtered ionized air into the filter intake port.

6. The combined ionic air filter and humidifier apparatus of claim 5 wherein at least one of the fans is positioned to direct filtered ionized air around the humidifier manifold, and wherein the humidifier manifold has an elliptical cross-section.

7. The combined ionic air filter and humidifier apparatus of claim 5 further including a ducted cowling between the ionic air filter and at least one of the fans.

8. The combined ionic air filter and humidifier apparatus of claim 1 wherein the humidifier is an ultrasonic humidifier.

9. The combined ionic air filter and humidifier apparatus of claim 1 wherein the humidified intake port is located at one end of the humidifier manifold, the discharge port is located at another end of the humidifier manifold, and the filter intake port is located in a side of the humidifier manifold.

10. The combined ionic air filter and humidifier apparatus of claim 9 wherein the humidifier manifold includes a manifold wall extending from the filter intake port toward the humidifier intake port and configured to direct the filtered ionized air across the humidifier intake port before passing to the discharge port.

11. The combined ionic air filter and humidifier apparatus of claim 1 wherein the humidifier is located in a base, and wherein the ionic air filter, the at least one fan and the humidifier manifold are located in a housing extending from the base.

12. The combined ionic air filter and humidifier apparatus of claim 11 wherein the housing includes an intake side and a discharge side, wherein the ionic air filter is located proximate the intake side, wherein the humidifier manifold is located proximate the discharge side, and wherein the fan module is located between the ionic air filter and the humidifier manifold.

13. The combined ionic air filter and humidifier apparatus of claim 12 wherein the discharge port of the humidifier manifold is located on the discharge side of the body portion such that the humidified filtered ionized air is directed out of the discharge side.

14. The combined ionic air filter and humidifier apparatus of claim 12 wherein the housing includes a discharge grill covering the discharge side, and wherein the discharge port of the humidifier manifold is configured to pass at least partially through the discharge grill.

15. The combined ionic air filter and humidifier apparatus of claim 10 further including at least one removable water tank configured to be fluidly coupled to the base.

* * * * *